United States Patent [19]

Garnett

[11] 4,155,456
[45] May 22, 1979

[54] INDEPENDENT PRODUCE SORTER FOR INSTALLATION ON A PRODUCE HARVESTER

[75] Inventor: Eric W. D. Garnett, Manassas, Va.

[73] Assignee: AMF Incorporated, White Plains, N.Y.

[21] Appl. No.: 869,198

[22] Filed: Jan. 13, 1978

[51] Int. Cl.² ............................................. B07C 5/342
[52] U.S. Cl. .................................. 209/580; 209/935; 209/638
[58] Field of Search ............... 269/935, 638, 912, 917, 269/580

[56] References Cited

U.S. PATENT DOCUMENTS

| 3,200,888 | 8/1965 | Lehde et al. | 209/935 |
| 3,390,768 | 7/1968 | Button | 209/935 |
| 4,081,362 | 3/1978 | Chamberlin | 209/638 |

*Primary Examiner*—Allen N. Knowles
*Attorney, Agent, or Firm*—George W. Price; John H. Gallagher

[57] ABSTRACT

A produce sorting unit that is a separate item of commerce intended for mounting on an existing produce harvester that has a conveyor for conveying produce to be sorted or graded. The unit comprises a frame that is adapted to be lifted onto the existing harvester and installed without requiring major alterations or modifications to the harvester. The frame supports a pair of produce elevating conveyor belts that extend outwardly from the frame and downwardly to the harvester conveyor to pick up produce therefrom. A horizontal conveyor belt supported on the frame receives produce from the elevating conveyor belts and carries it to an inspection location. The unit also includes a rejected produce conveyor belt underlying and extending transversely to the horizontal conveyor belt. Optic-electronic sorting means secured to the frame is responsive to light received from the produce as it is discharged from the horizontal conveyor at the inspection location. Ejection paddles operable in response to the sorting means can be moved into the paths of the produce to divert unacceptable produce to the rejected produce conveyor belt. The unit includes means for driving each of the belts.

17 Claims, 4 Drawing Figures

FIG. I

INDEPENDENT PRODUCE SORTER FOR INSTALLATION ON A PRODUCE HARVESTER

BACKGROUND OF THE INVENTION

The invention relates to a separate produce sorting or grading unit that may be added to and removed from conventional produce harvesters without substantial alteration to the existing harvester.

Produce harvesters, such as tomato harvesters, are well known in the art. Harvesters of the type of which the unit of this invention may be added remove the growing tomato plants from the ground and separate the tomatoes from their vines and accompanying clods of dirt, etc. The separated tomatoes ultimately ride on a horizontal sorting conveyor from which the green and otherwise unacceptable tomatoes are removed, either by hand or by an automatic sorter.

It has developed in the automatic tomato sorting and grading industry that much of the automatic sorting apparatus is manufactured by companies that are different from the manufacturers of the harvester equipment. The sorting apparatus commonly includes a short singulator conveyor belt that presents the produce in aligned rows to the inspection unit. It was common in the past to physically "cut open" a standard harvester unit and weld or otherwise permanently insert the sorting or grading apparatus into the harvester in an attempt to make the harvester-sorter one integral unit. The modification work usually was performed at or near the farms where the existing harvesters were located. This work involved local workmen who did not always possess the required skills and training, and who were not under control of the manufacturer of the sorter equipment. Such modification involved substantial harvester down time, welding, custom fabrication, etc. In addition, after the sorter was inserted as an integral part of the harvester, it was difficult, if not impossible, to use the harvester in its original manner of operation. Also, the power requirements of the added sorter equipment may be such that the original harvester power supply could not supply the added load, thereby making it necessary to modify or replace the original harvester power supply.

SUMMARY OF THE INVENTION

One object of this invention is to provide a self contained produce sorting or grading unit which may be simply and easily installed on and removed from known types of harvesters with relatively little modification of the harvester.

In the preferred embodiment of the invention, the sorter unit comprises a frame on which a pair of produce elevating belts are pivotally mounted. The frame can be secured by a few bolts, e.g. eight bolts, to the conventional harvester frame. The receiving ends of the elevating belts are positioned over the harvester conveyor belt and are adjustable with respect thereto. The sorter unit frame also carries a singular conveyor belt which, at its receiving end, receives the produce from the elevating belts and conveys the produce in aligned rows to inspection locations where it is examined by an optic-electronic grader or sorter apparatus mounted on the unit frame. The inspected produce falls from the singulator conveyor belt and passes by a plurality of air-operated ejector paddles, one for each row of produce. The paddles are under control of the grader or sorter apparatus and either remain in position to permit acceptable produce to fall back onto the conveyor of the harvester from which it was first removed, or they move into the paths of falling produce to eject unsatisfactory produce onto a reject conveyor that is carried by the unit frame. The pair of produce elevating belts, the singulator conveyor belt and the reject conveyor are driven by an electric motor that is mounted on the unit frame. The motor and sorter preferably are powered by a separate power unit which supplies both electricity and air required by the unit, and which can be mounted at any convenient position on the harvester.

Such object and other objects of the invention will be apparent from the following detailed description of a presently preferred embodiment of the invention, which description should be considered in conjunction with the accompanying drawing in which:

DESCRIPTION OF PREFERRED EMBODIMENT

Figure 1:
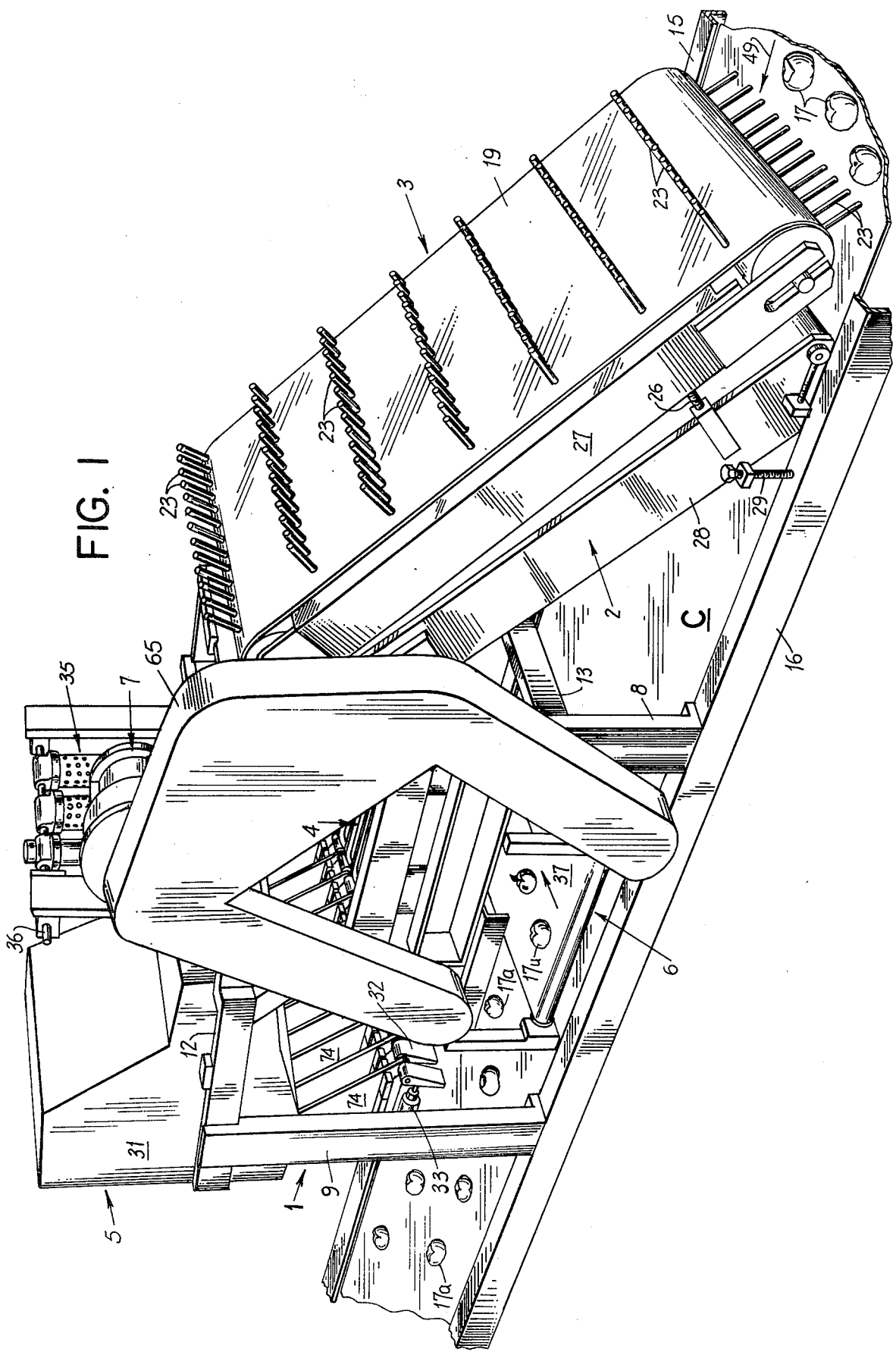
FIG. 1 is a perspective view of the preferred embodiment of the sorter unit of the invention and is shown mounted on a harvester conveyor support.

The invention will be described in connection with the sorting of tomatoes by color, but it is to be understood that the invention is applicable to the sorting and grading of other produce and articles, and to sorting and grading other than by color.

The separate and independent produce grader or sorter unit illustrated in FIGS. 1–4 comprises a unit frame 1, produce elevating conveyor means including a pair of generally parallel produce elevating conveyors 2 and 3, a horizontal singulator conveyor 4, optic-electronic sorting or grading means 5, rejected produce conveying means 6, and conveyor driving means 7.

Frame 1 includes four support legs 8–11 secured together by various cross pieces such as the cross pieces 12 and 13 that may be bolted or welded to the legs. Legs 8–11 are shown secured at their lower ends by eight bolts 14 to the beams 15 and 16 of a harvester frame. The harvester includes a horizontal conveyor belt C that carries articles of produce 17 such as tomatoes that desirably have been separated from waste materials such as vines, dirt clods, etc. In practice, conveyor C may be the sorting conveyor of a produce harvester. A commercially available produce harvester may have two such conveyors, in which case two units of the present invention will be utilized on the harvester.

The upper produce elevating conveyor 3 is supported at one end from a driven shaft 18 (FIGS. 2 and 4) rotatably mounted on the upper portion of frame 1. Endless belt 19 of conveyor 3 is driven by roller 20 on the shaft 18 in a direction that causes its surface that faces the endless belt 21 of the conveyor 2 to move in the direction of the arrow 22. Belt 19 carries a plurality of upstanding, flexible fingers 23 made of rubber or some other elastomeric material. The fingers are arranged in rows extending transversely to the direction of movement of the belt. Fingers 23 are stiff enough to push the produce 17 onto the belt 21 without damage to the produce, and are close enough together so that the produce cannot pass therebetween or become wedged therebetween. The rows of fingers 23 are spaced apart by a distance greater than the dimensions of the produce 17, but are close enough to move a substantial quantity of produce in a given amount of time. Fingers 23 cause a first order of singulation of the produce 17. In that regard, the linear surface speed of belt 19 is slightly greater than that of belt 21.

The lower belt 21 of produce elevating conveyor 2 has no fingers and has a surface that is generally parallel to the facing surface of upper belt 19. The two belts are spaced apart by a distance slightly greater than the height of the fingers 23. The height of fingers 23 is greater than the dimensions of the produce 17. Belt 21 is driven by a roller 25 (FIG. 2) that is in turn secured to a driven shaft 24. Shaft 24 is rotatably mounted at the upper portion of the frame 1.

Conveyors 2 and 3 extend outwardly and downwardly from the upper portion of the input end of frame 1, and are pivotable around the axes of shafts 18 and 24. The spacing between belts 19 and 21 is adjustable by means of adjusting bolts, one bolt 26 being visible in FIG. 1. Bolt 26 extends between the side plates 27 and 28 of conveyors 2 and 3 respectively. The positions of the lower ends of conveyors 2 and 3 with respect to the surface of conveyor belt C is adjustable by means of adjustable bolts 29. The lower end of bolt 29 engages the upper surface of harvester beam 16, and the lower end of the corresponding bolt at the opposite side of the produce elevating conveyors 2 and 3 engages the upper surface of the opposite harvester beam 15.

Figure 3:
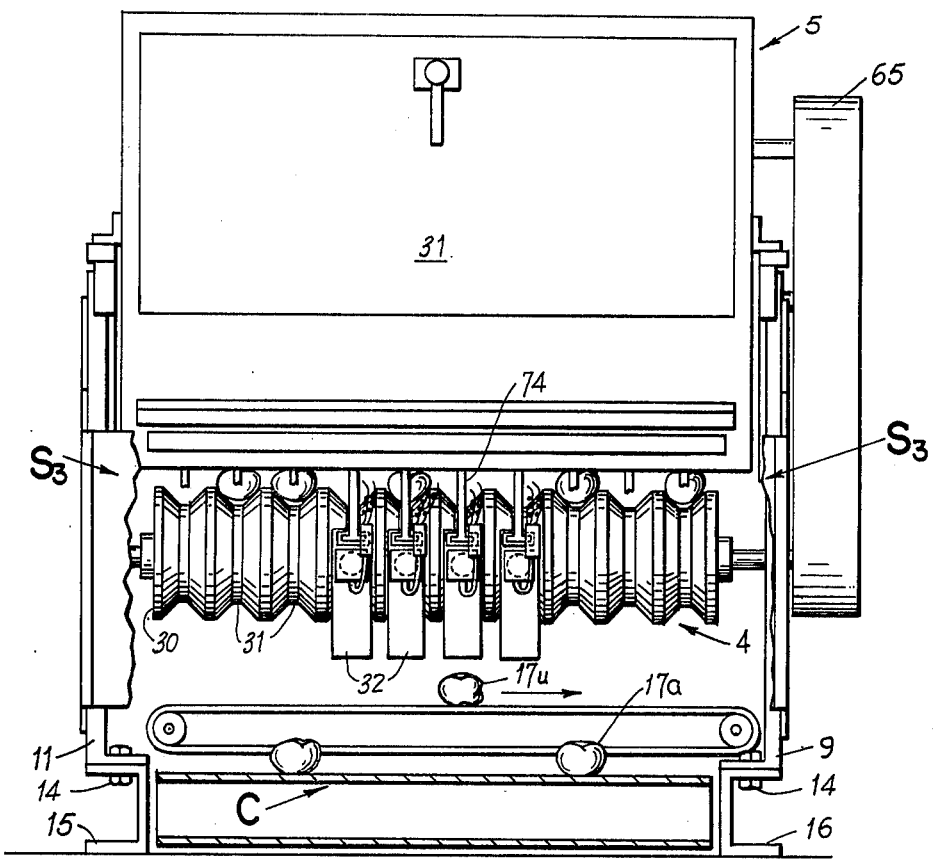
FIG. 3 is an end view taken from the left in FIG. 2 with parts removed for explanation purposes.

The singulator conveyor 4 preferably comprises an endless belt 30 having a plurality of longitudinally extending grooves 31, FIG. 3. Belt 30 may be made of a fabric covered with elastomeric material and having ribs formed of elastomeric material. The upstream end of belt 30 is adjacent and below the discharge end of conveyor 2 so that produce 17 elevated by the conveyors 2 and 3 drops onto the belt 30. The produce is thus conveyed in aligned rows.

Singulator conveyor 4 overlies a portion of the harvester belt C that does not carry produce 17 because the produce was removed from belt C by the produce elevating conveyors 2 and 3.

Automatic sorting means mounted at or adjacent the output end of the frame 1 may be of any suitable type. The color grading apparatus disclosed in U.S. Pat. Nos. 3,944,819 and 3,981,590 is representative of suitable apparatus that may be used. The upper portion 31 of the color sorting means contains light generating and measuring elements, and electronic signal processing circuitry. Light is directed onto the produce 17 as it is discharged in free fall paths from the belt 30. Light reflected from each article of produce 17 is analyzed in the sorter apparatus 31 to determine its characteristics.

Figure 2:
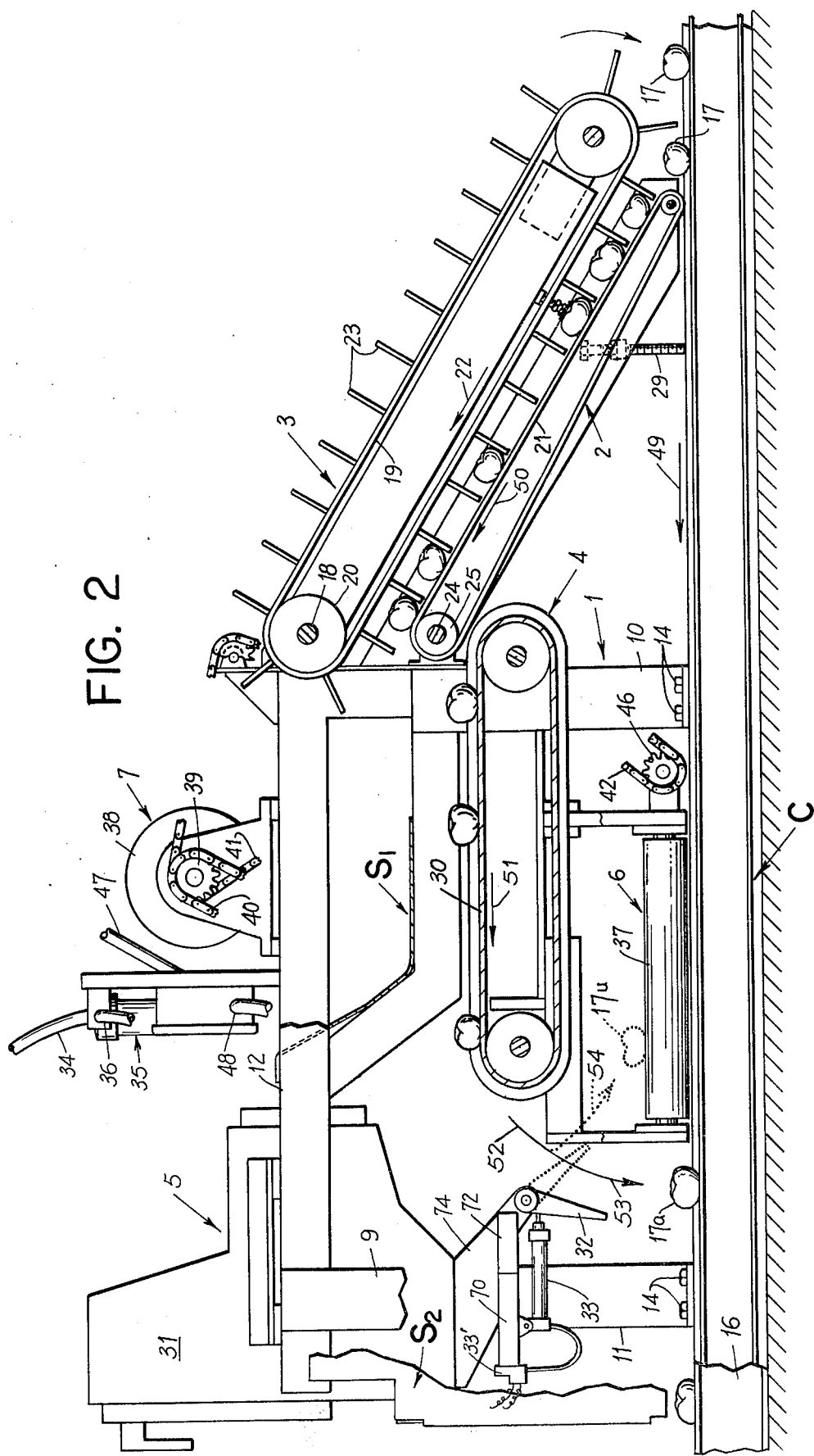
FIG. 2 is a side elevation view of the embodiment illustrated in FIG. 1 with parts removed for explanation purposes.
Figure 4:
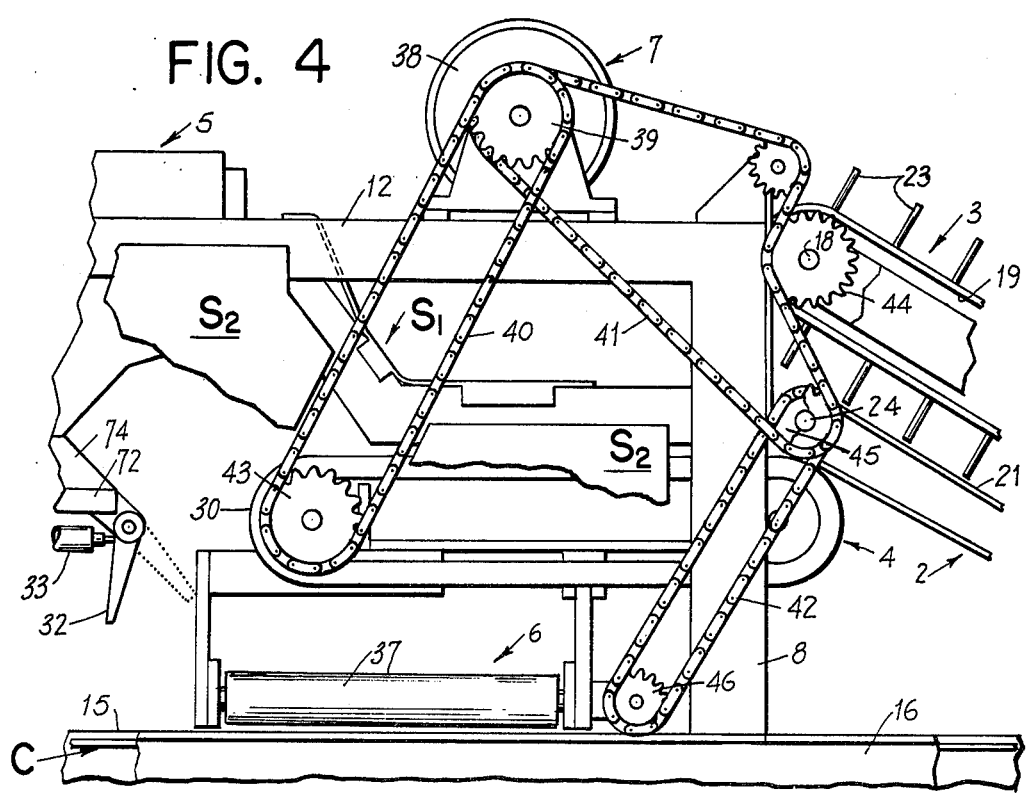
FIG. 4 is a fragmentary side elevation view similar to FIG. 2.

A light shield in included in the region below color sorting means 5 to reduce the ambient light in the region where the articles of produce are illuminated and viewed by the color sorting means. The light shield is not shown in FIG. 1 in order to illustrate interior portions of the apparatus. FIGS. 2–4 show the light shield in fragmentary portions, again in order to show interior portions of the apparatus. As illustrated in FIGS. 2 and 4, the top portion $S_1$ of the light shield extends horizontally over the downstream half of singulation conveyor 4 and then is inclined upwardly toward the upper portion 31 of the color sorting means. The light shield has side portions $S_2$ on each side of the inspection region where the articles are viewed. A portion $S_3$ of the light shield encloses the discharge end of the viewing region of the apparatus.

If an article being viewed by the color sorting means is unacceptable, a respective one of the plurality of paddles 32 is moved by the associated piston and cylinder device 33 from the position shown in solid lines in FIGS. 2 and 4 to the position shown in broken lines. In the latter position the paddle 32 is in the free fall path of the article. There is one paddle 32 and its associated actuating means for each groove 31 in belt 30. Each piston and cylinder 33 and associated solenoid valve $33^1$ is attached to a bracket 70 that fits onto a complementarily shaped bracket 72 that is supported on a hanger member 74. All the hanger members 74 are attached to the bottom of the housing of the color sorter unit 5. Some of the paddles 32 have not been illustrated in the drawings in order to simplify the description and drawings.

Each piston and cylinder device 33 operates in response to a signal supplied to its solenoid valve $33^1$ from color sorter 5. Compressed air is supplied by way of a hose 34 that extends to a source of compressed air (not shown) which may be part of the existing harvester equipment (if it has adequate capacity), or which may be an additional air compressor mounted at a convenient place on the harvester. The air may be fed from the hose 34 through conventional gauges, pressure regulators, filters and dryers, indicated generally at 35, and to the manifold for the devices 33 by way of a hose 36.

The preferred embodiment of the invention includes a rejected produce conveying means 6 in the form of a conveyor belt 37 that moves in a direction transverse to the direction of movement of the harvester belt C. Belt 37 ejects unacceptable produce 17 onto the ground or into a suitable receptacle at one side of the harvester. However, other known rejected product conveying means can be employed. For example, rejected produce could be received on the portion of the belt C underlying the belt 30 and be removed therefrom by a driven brush such as a driven brush auger that sweeps rejected produce off a side of the belt C.

Alternatively, the sorter unit of this invention could be placed at the very end of a harvester conveyor belt C so that acceptable produce follows its free fall path into a receptacle or onto another conveyor, but unacceptable produce is ejected downwardly directly onto the ground. This arrangement would not require the rejected produce conveying means 6.

Preferably driving means 7 is an electric motor 38 with a speed reducer that drives a sprocket 39 connected by chains or toothed belts 40, 41 and 42 to the drive sprockets 43, 44, 45, and 46, respectively, of the singulator conveyor 4, the produce elevating conveyors 2 and 3, and the rejected produce conveyor 6. The sprockets and drive chains are enclosed within a safety shield 65, as illustrated in FIGS. 1 and 3. If desired, driving means 7 could be a hydraulic motor supplied by a hydraulic source on the harvester.

Electric power is supplied to the motor 38 and the sorting means 5 by way of electric cables 47 and 48, FIG. 2. Cable 47 extends to a power source that may be the harvester electric power source if it has adequate capacity, or which may be a separated electric power source mounted at a convenient place on the harvester. The separate electric power source and the separate air compressor mentioned above may be mounted on an additional frame which is mounted on the harvester.

In the operation of the illustrated embodiment, acceptable and unacceptable articles of produce move on harvester belt C in the direction of the arrow 49 until they reach the lower ends of the produce elevating conveyors 2 and 3. The bottom roller of lower conveyor 2 has a diameter of the order of one inch so that the articles of produce 17 are easily pushed onto belt 21 by the elastomeric fingers 23 on belt 19. As previously mentioned, belt 19 moves at a slightly faster speed than belt 21. Consequently, fingers 23 have somewhat of a sweeping action to move the produce from the harvester conveyor belt C onto belt 21. As illustrated in FIG. 2, fingers 23 on belt 19 and the flat belt 21 cooperate to raise the produce to the upper left end of conveyor 2. The produce then drops off the end of belt 21 and falls onto singulator conveyor 4. The articles of produce settle in the recess of the grooved belt 30 and are carried in aligned rows to the color grading or sorting apparatus 5.

At the discharge end of the belt 30 the rows of produce are discharged along respective free fall paths 52. Each article is illuminated and inspected by the sorting means 5, and if found to be acceptable is permitted to continue along the free fall path 53. The acceptable articles of produce thus are returned to harvester conveyor belt C. If an article of produce fails to meet the predetermined standards of the sorting means 5, a respective eject paddle 32 is actuated by a respective solenoid valve 33¹ and piston and cylinder device 33 to direct the unacceptable item along the path 54 and onto the rejected produce conveyor belt 37. One such rejected item is designated 17u in FIG. 2. The actuated paddle 32 immediately returns to its initial position shown in solid lines where it is ready to be actuated in response to another command from sorter unit 31.

It will be observed that the portable unit of the invention may be easily installed onto an existing produce harvester merely by lifting the unit into position and bolting it down. Thus, assuming that eight bolts 14 are used, it is merely necessary to drill eight holes in the harvester conveyor beams 15 and 16, position the sorter unit so that its legs 8-11 engage the beams 15 and 16, insert and tighten the bolts 14, and connect the air hose 34 to an air source and the electrical cable 47 to an electric power source. Of course, means other than bolts 14 may be used to fasten the frame 1 to the harvester.

Similarly, the portable sorter or grader unit may be easily removed from the harvester by disconnecting the air hose 34 and the cable 47, by removing the bolts 14 and by lifting the unit off the harvester conveyor beams 15 and 16. If the use of the unit is to be discontinued only temporarily and the rejected produce conveying means 6 is high enough above the belt C to permit the belt C to convey produce 17 underneath the conveying means 6, operation of the harvester independently of the sorter unit may be carried out by merely raising the lower ends of the elevating conveyors 2 and 3 above the belt C a distance sufficient to permit produce 17 to pass under the lower ends of the conveyors 2 and 3, bearing in mind that the latter may be pivoted around the axes of the shafts 18 and 24.

The use of the separate and independent sorter or grading unit is not restricted to use with a harvester. It could just as well be installed over a conveyor in processing and packing plants.

Although preferred embodiments of the present invention have been illustrated and described, it will be apparent to those skilled in the art that various modifications may be made without departing from the principles of the invention.

What is claimed is:

1. A separate unit of manufacture capable of operating in accordance with predetermined criteria to distinguish and separate acceptable from unacceptable articles presented to it, said unit being adapted to be used with equipment that includes a first conveyor that conveys said acceptable and unacceptable articles, said unit comprising
   a frame separate and independent of said first conveyor and having upper and lower portions and input and output ends,
   said frame including supporting means for supporting the frame on said equipment,
   article elevating conveyor means mounted on said frame and extending in a downwardly direction for receiving articles that are moving on said first conveyor toward the input end of the frame when the unit is positioned on said equipment,
   said elevating conveyor means moving received articles in a direction toward the upper portion of said frame,
   automatic sorting or grading means supported on said frame adjacent the output end thereof for distinguishing acceptable and unacceptable articles presented thereto,
   means for presenting elevated articles to said automatic sorting or grading means,
   ejector means supported on said frame at or adjacent its output end and operable in response to said automatic sorting or grading means for separating acceptable and unacceptable articles, and
   driving means on said frame for driving said article elevating conveyor means.

2. The combination claimed in claim 1 wherein said means for presenting elevated articles to said sorting or grading means includes,
   an additional conveyor having an input end adjacent the discharge end of the elevating conveyor means and having a discharge end located to present articles to said sorting or grading means.

3. The combination claimed in claim 2 wherein said additional conveyor includes means for presenting the articles in aligned rows to the sorting or grading means.

4. The combination claimed in claim 1 including
   discharge conveyor means positioned adjacent said ejector means for receiving separated articles from the ejector means and conveying them in a direction transverse to the direction of movement of articles on the elevating conveyor means.

5. The combination claimed in claim 4 wherein said means for presenting elevated articles to said sorting and grading means includes,
   an additional conveyor having an input end adjacent the discharge end of the elevating conveyor means and having a discharge end located to present articles to said sorting or grading means,
   said discharge conveyor means being located below said additional conveyor and extending transversely thereto.

6. The combination claimed in claim 5 wherein said additional conveyor includes means for arranging articles in aligned rows.

7. A separate unit of manufacture that may be placed on a produce harvester to add automatic produce sorting and/or grading capabilities to the harvester without requiring significant alteration to the basic structure of the harvester, said harvester including a horizontally moving conveyor belt for carrying harvester articles of produce, said unit comprising a frame separate and independent of the harvester and having upper and lower portions and input and output ends, supporting legs on the frame for supporting the frame on the harvester in spaced relationship above the harvester conveyor belt, a pair of endless conveyor belts attached to said frame and having surfaces closely adjacent each other for at least a portion of their lengths, said pair of belts being inclined downwardly and extending outwardly from the input end of the frame, the first ends of said pair of belts being adapted to be disposed closely adjacent said horizontally moving conveyor belt of the harvester and adapted to pick up articles of produce from said horizontal belt and convey them between the adjacent surfaces of the belts to the upper portion of the frame, a second horizontal conveyor belt supported on said frame for receiving produce discharged from the second ends of said pair of belts and for conveying said produce to its discharge end, produce sorting or grading means supported on said frame at or adjacent the discharge end of the second horizontal conveyor for sorting or grading according to predetermined characteristics the articles of produce presented to it by the second horizontal conveyor belt, means supported on the frame adjacent the discharge end of the second horizontal conveyor for separating sorted or graded produce, and means supported by said frame for actuating said conveyor belts that are attached to and supported by the frame.

8. The combination claimed in claim 7 wherein the second horizontal conveyor belt on said frame is aligned parallel to said harvester horizontal conveyor and is spaced above it.

9. The combination claimed in claim 8 and further including a discharge conveyor belt supported on said frame below the second horizontal conveyor belt and extending transversely thereto, said means for separating the produce operating to eject unacceptable produce discharged from the second horizontal conveyor onto the discharge conveyor belt.

10. A sorting or grading unit for mounting on equipment having a first conveyor that carries articles such as produce, said unit comprising a frame separate and independent from said equipment and having an upper portion, a lower portion, an input end, and an output end, said frame adapted to be placed over or adjacent said first conveyor that carries articles to be sorted, produce elevating conveyor means mounted at the upper portion of said frame and extending in a downwardly direction for receiving produce moving on said first conveyor when the unit is mounted on said equipment, said elevating conveyor means moving received articles toward the upper portion of said frame, third conveyor means mounted on said frame and having a receiving end adjacent a discharge end of said elevating conveyor for receiving articles of produce discharged from the elevating conveyor, a discharge end of the third conveyor means being disposed at or adjacent the output end of said frame, automatic sorting or grading means supported on said frame adjacent the output end thereof for distinguishing desirable and undesirable articles of produce presented thereto by the third conveyor means, ejector means supported by said frame and disposed adjacent the discharge end of the third conveyor means for separating desirable and undesirable articles of produce, and drive means on said frame and connected to all of said conveyor means for driving said conveyors on the frame.

11. The produce sorting unit set forth in claim 10 wherein said elevating conveyor means comprises a pair of elevating conveyors mounted one above the other with respective movable surfaces adjacent and facing each other, said surfaces being spaced apart a distance sufficient to receive said produce therebetween and wherein said driving means moves said surfaces in the same direction.

12. The produce sorting unit set forth in claim 11 wherein said elevating conveyors comprise belts and wherein the belt of said one elevating conveyor has a plurality of flexible, upstanding fingers thereon, said fingers being spaced apart transversely to the direction of movement of said surfaces and being arranged in rows spaced apart in the direction of movement of said surfaces.

13. The produce sorting unit set forth in claim 12 wherein said driving means moves the belt having said fingers thereon at a linear speed greater than the linear speed of the other belt.

14. The produce sorting unit set forth in claim 10 wherein said third conveyor is a belt having a plurality of spaced grooves on the surface thereof, said grooves extending in the direction of movement of said third conveyor.

15. The produce sorting unit set forth in claim 14 wherein said means in said discharge path of the produce comprises a plurality of pivotally mounted ejector paddles disposed adjacent the discharge end of said third conveyor.

16. The produce sorting unit set forth in claim 10 and including an ejected produce conveying means mounted below said third conveying means and at a position for receiving said ejected produce, said ejected produce conveying means moving ejected articles of produce in a direction transverse to the direction of surface movement of said third conveyor.

17. In combination, a produce harvester having a produce conveyor with supporting means therefor and the sorting or grading unit of claim 10 mounted on said harvester with said frame of said unit secured to said supporting means, said elevating conveying means, said third conveyor and said sorting means being positioned above said produce conveyor.

* * * * *